May 27, 1952 J. R. SHONNARD 2,598,612

MODULATING SYSTEM AND APPARATUS

Filed Dec. 30, 1948

INVENTOR.
J. R. SHONNARD
BY E. R. Evans
his attorney

Patented May 27, 1952

2,598,612

UNITED STATES PATENT OFFICE 2,598,612

MODULATING SYSTEM AND APPARATUS

John R. Shonnard, New York, N. Y., assignor to Times Facsimile Corporation, New York, N. Y., a corporation of New York Application December 30, 1948, Serial No. 68,229

12 Claims. (Cl. 178—7.2)

This invention relates to methods and apparatus for generating facsimile and television signals, and more particularly to a scanning tube or cell for picture or image transmitting systems, the present invention being in the nature of an improvement in or modification of the invention described in my prior Patent No. 2,459,293 granted January 18, 1949.

In general terms, the object of the invention is to provide a simplified pickup modulator tube or system for picture transmission adapted to generate a modulated carrier which is free of any direct-current components.

In the case of ordinary modulator systems used in facsimile and television transmitting systems, the output current from the modulator is either a D. C. signal or a modulated carrier which is distorted to a greater or less extent by the direct-current components produced by the ordinary photocell or pickup tube. As pointed out in my prior patent referred to above, this difficulty may be overcome by employing a photocell for optical scanning comprising two photo-electric cathodes so connected to the source of carrier current and the output circuit as to produce a modulated carrier in the output circuit which is free from direct-current bias as, for example, by connecting the cathodes in opposition to balance out the D. C. component encountered in the usual single-element photocell. The present invention relates to an improved construction of tube or cell having two contiguous cathodes and a single neutralizing electrode in the modulator per se. In a preferred form, the invention utilizes electronic scanning, more particularly for television or high-speed facsimile transmission.

Another object of the invention therefore is to provide improved modulating or signal-generating means including a camera tube for television or facsimile transmission.

A further object of the invention is to provide an improved pickup tube of the electronic camera type in which two electron-emissive cathodes are employed as collector plates associated with the signal output circuit to improve the wave shape or modulating characteristics of the transmitted signal.

A still further object of the invention is to provide an improved arrangement of this character for modulating an alternating carrier-current source in accordance with the electron emission from a photo-sensitive plate or screen on which a virtual image of the picture to be transmitted is formed.

A still further object of the invention is to provide an improved electronic camera tube having an output signal wave of desired characteristics.

Figure 1:
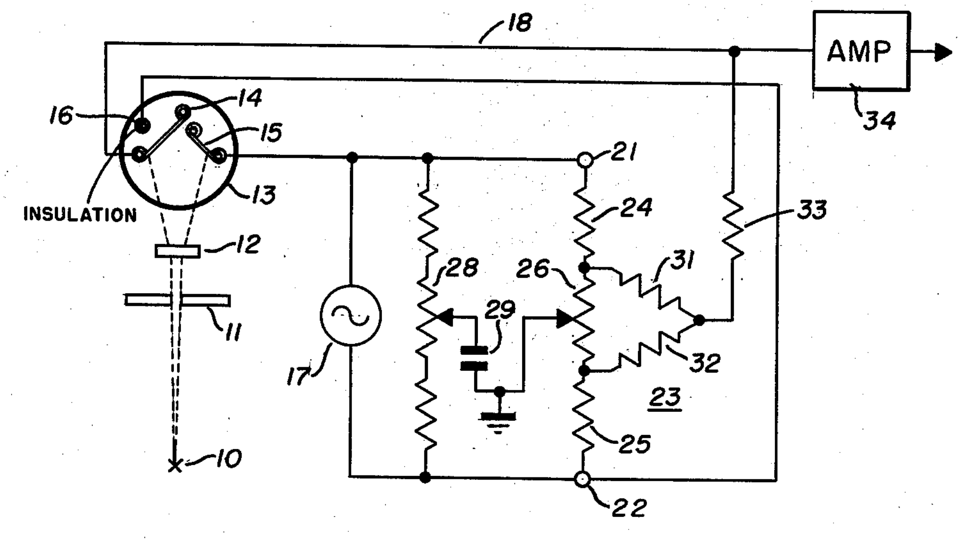
Figure 2:
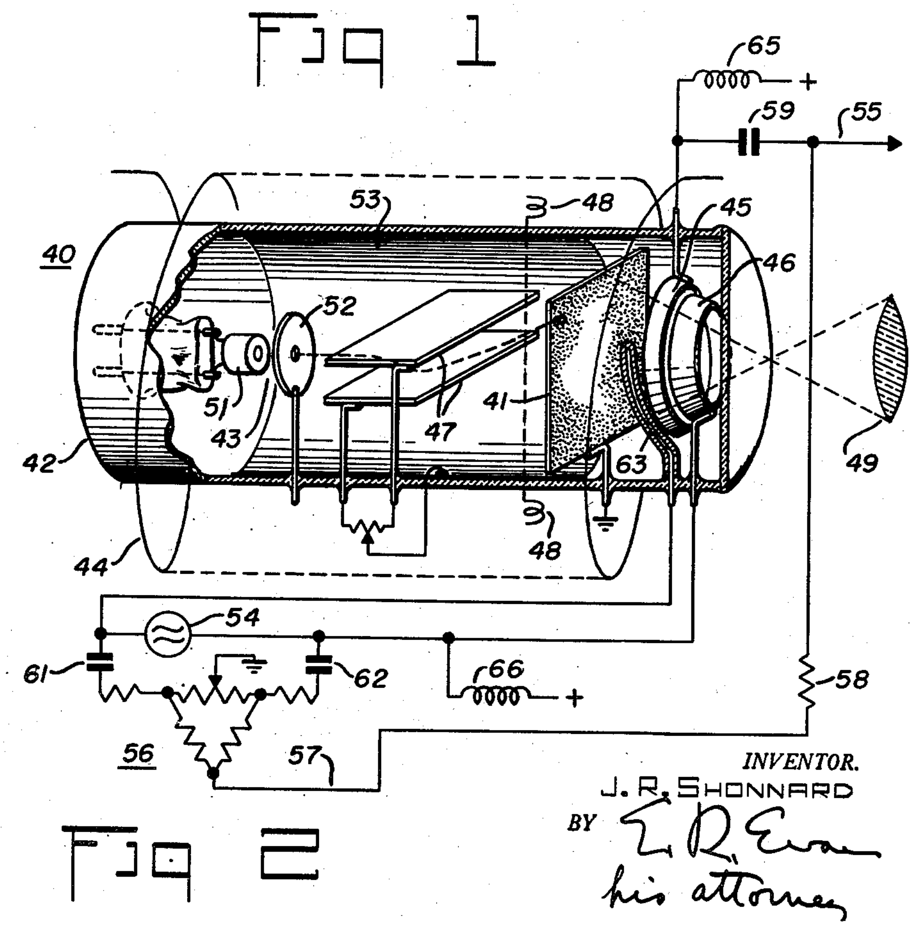

The invention will be more readily understood from the following description of the preferred embodiments thereof shown in the accompanying drawing, in which:

Fig. 1 is a schematic representation of a modulator system according to this invention; and Fig. 2 is a similar view of a modification including an electron camera tube.

Referring more particularly to Fig. 1 of the drawing, a modulator is shown by way of example for generating picture signals or the like in accordance with the varying light from a source 10, which may consist of the elemental areas of a picture to be transmitted by facsimile in the usual manner. This application of the invention is described in my prior patent, above referred to, but the invention is not limited to this particular field. A beam of light defined by the optical system, which may include an aperture plate 11 and light dispersing layer 12 of mat finish film such as Kodapak diffusion sheet, is directed upon a photocell 13. The photocell 13 is so oriented that its two photo-electric cathodes, 14 and 15, are equally illuminated by the modulating light from the source 10. The electron-emissive cathodes may be mounted in overlapping relationship, as shown, so that the opposed light-sensitive coatings intercept the entire beam of light and each emits the same electron current. A capacity-balancing or neutralizing electrode 16 is mounted inside of the envelope of the cell adjacent one of the cathodes, the size and spacing of said electrode being such that the capacitance between said electrode and the adjacent cathode is substantially equal to the capacitance between the two cathodes. The neutralizing electrode is preferably insulated or shielded against electron emission, as shown, to obviate space current flow to either cathode. A glass tube may be employed for this purpose. A cell of this type which may be used in telephoto or telefacsimile equipment is the RCA #5652 phototube.

In accordance with the invention, an alternating wave or carrier current modulated in amplitude according to the variations in the intensity of light impinging on the photocell is obtained by impressing an alternating carrier from an A. C. source 17 upon the electrodes of the photocell 13 in such a manner that each cathode 14, 15, reverses its polarity with respect to the other cathode during alternate half-cycles of the carrier. By neutralizing the capacity between the cathodes and adjusting the illumination and emissivity of the cathodes to equalize the current flow between the cathodes, each of which functions alternately as a cathode and as an anode, a modulated alternating carrier appears in the output circuit 18 which is free of D. C. or keying components. In order to accomplish this with a cell having two cathodes and a single neutralizing electrode, a feature disclosed but not claimed in my prior patent above referred to, the carrier source 17 may be connected as shown to the outer terminals 21 and 22 of the resistance arms of a bridge network 23, of which two arms are comprised by the interelectrode capacities between cathodes 14 and 15, and between cathode 14 and neutralizing electrode 16, respectively. Consequently the carrier source 17 is also connected to cathode 15 and electrode 16, as indicated.

The resistance arms of the bridge network, as shown, include resistors 24 and 25, and a potentiometer 26 in series relation. The potentiometer, having its movable contact grounded, permits balancing the bridge network to the null point (zero output current) at any desired level of illumination of the photocell 13. This adjustment, together with the phase-shifting network comprising a shunt resistor 28 and a capacitor 29, as described in the patent to W. P. Asten, No. 2,430,095, granted November 4, 1947, enables positive or negative transmission at will, as well understood by those skilled in the art. Auxiliary resistors 31 and 32 are connected as shown to provide a fixed center tap on the resistance arms of the bridge network 23 for the load resistor 33 in the grid circuit of amplifier 34.

In the modulator system according to the invention, the two reversely-connected cathodes 14 and 15 become alternately operative to produce a current flow in the output circuit 18 upon alternate half-cycles of the alternating electromotive force from the carrier source 17. The magnitude of the photocell current depending upon the illumination of the cathodes, an output carrier wave is generated which is modulated in accordance with the light variation from the source 10 and does not contain any D. C. component as in the case of the ordinary photocell modulator. In actual practice, it is found that the distortion in transmission is reduced and an improvement in recording of picture signals is effected. Obviously the invention can be applied to the transmission of other light variations than those produced by scanning a picture, if desired.

Fig. 2 shows an electronic camera tube in a modulator system embodying the invention. As shown, the tube 40 is a transmitter tube employing a two-sided mosaic 41 containing photo-E. M. F. elements. The tube 40 comprises an evacuated envelope 42 enclosing the mosaic target 41, an electron gun 43 for generating and, in cooperation with a magnetic focusing coil 44, for focusing a beam of low velocity electrons towards this target, two electron collecting and emissive electrodes 45 and 46 on the side of the target 41 remote from the electron gun 43 and the usual sets of deflecting elements comprising the deflecting plates 47 and the magnetic coils 48 for causing the beam of electrons to scan every elemental area in turn of picture image on the mosaic target 41. Radiations from an object or field of view are applied to the side of the mosaic target 41 remote from the electron gun by means of any suitable optical system represented schematically by the lens 49.

The electron gun 43 preferably comprises a cathode (not shown), a control electrode member 51 surrounding the cathode, a first anode member 52, and a second and final anode member comprising a coating 53 of conducting material on the inside walls of the envelope 42. The focusing coil 44 assists in the focusing of the electron beam in a manner well known in the art. The conducting coating 53 is preferably placed at a positive potential of about 50 to 100 volts with respect to the cathode. The collecting electrodes 45 and 46, corresponding to the photo-sensitive electron-emissive electrodes 14, 15 of Fig. 1, are adapted to emit electrons under the excitation of the electron beam emanating from the mosaic target 41. When an alternating potential of, say, 5 mc. is impressed upon the electrodes 45 and 46 from the carrier source 54, an alternating carrier is generated in the output circuit 55, modulated in amplitude in accordance with the instantaneous variations in the electron current from the mosaic 41 generated in response to the scanning beam.

As well known to those skilled in the art, the scanning arrangement produces a beam of low-velocity focused electrons striking the target 41. This beam is deflected to scan a field thereon by means of appropriate potentials applied to the deflecting plates 47 and appropriate currents passed through the coils 48 by means of suitable sweep circuits (not shown). A high resistance is preferably connected between the plates 47 which, as in the well-known "Orthicon," are made as wide as the target 41 or the field to be scanned thereon, bearing an image to be transmitted. The mid-point of this high-resistance element is connected to the conducting coating 53, as shown, so that the potentials of the deflecting plates are balanced at all times with respect to the potential of the coating 53. For an example of a suitable electrostatic sweep circuit, reference is made to Patent 2,178,464, dated October 31, 1939, to M. W. Baldwin, Jr. Any suitable magnetic sweep circuit can be applied to the coils 48 such as, for example, one of those disclosed in Patent 2,315,073 of F. R. Norton, issued March 30, 1943.

The construction of the mosaic target 41 may be similar to the ordinary apertured mosaic plate employed in electronic camera tubes wherein the electron gun scans the side opposite to that on which the light radiations impinge. The mosaic target preferably comprises an apertured plate of any suitable material, such as nickel, carrying thereon on the side remote from the beam-generating means a multiplicity of photo-E. M. F. cells, each surrounding and partially filling an aperture in the plate. The plate is preferably placed at approximately ground potential or other suitable fixed potential. Each of the photo-E. M. F. elements may comprise, by way of example, a small copper oxide photo-E. M. F. cell, one form of which, as is well known in the art, comprises a layer of copper, a layer of cuprous oxide thereon which is treated by means well known in the art to produce a blocking layer, and a suitable conducting element, such as silver, covering the blocking layer.

A satisfactory method of making the mosaic screen is as follows: A screen perforated nickel foil, having a large number of fine, closely-spaced perforations, is dipped in a dilute solution of waxy or greasy material in benzene, carbon tetrachloride, or other solvent to give a thin film of wax or grease on the screen. The screen is then drawn over a gelatin roller heavily inked with etching (acid-resisting) ink so as to force ink through the holes of the screen and over a small area around each hole on the side away from the roller. The spreading of the ink can be assisted by a slight warming of the screen in benzene vapor. The part of the screen not covered by etching ink is then plated with a film or mask of silver or other metal which (because of the thin greasy or waxy film) can be stripped away later. The etching ink and waxy film under it are then removed by dissolving them in benzene. A copper film is then deposited on the plated side of the screen by evaporation. The copper is oxidized by any suitable process and the oxide surface thus formed is treated by electron or ion bombardment to produce a blocking layer for each individual cell. A very thin semi-transparent film of gold or other suitable conducting material is evaporated onto the small cell surfaces and the silver mask and the films on it are stripped away, leaving small photo-E. M. F. cells surrounding and partially filling each of the apertures in the plate. These cells are of the type known as a "front wall" cell. In each of these cells a negative potential with respect to the supporting plate is acquired by the semi-transparent metal layer when light radiations are applied to the cells. If desired, the cells can be produced instead by any suitable known process which produces a "back wall" type of cell. If the cells are of the "back wall" type, the semi-transparent layer becomes positive with respect to the supporting plate when light radiations are applied thereto. The arrangement in accordance with this invention is operable with either type of cell.

The operation of the arrangement shown in Fig. 2 is as follows. Radiations from an object or field of view are projected upon the right-hand side of the mosaic target 41 by means of the lens system 49. The low velocity beam of electrons, generated by the electron gun 43 and focused by this gun with the assistance of the magnetic focusing coil 44, approaches the target 41. The cathode ray beam is generally of such size that it covers several apertures in the target and the spaces between them. This beam has practically no forward velocity at the mosaic target 41 due to the fact that the target is at or near, cathode potential. Some of these low-velocity primary electrons pass through the apertures in the mosaic 41 and are attracted to the collecting electrodes 45 and 46, which are at a positive potential with respect to the mosaic and form in effect a single split or sectionalized collector means for the modulated electron emission from the target 41. Each electrode 45, 46, is also electron-emissive when energized by electron bombardment from the mosaic 41. The number of electrons which pass through any particular aperture in the target is dependent upon the potentials generated across the individual photo-E. M. F. cells by the light radiations applied thereto from the corresponding elemental areas of the object. Thus the electron current flowing to the collector means or electrodes varies as the mosaic is scanned and the action of the photo-E. M. F. cells is somewhat analogous to that of a grid in a triode. Unlike the storage type of electron camera tube using photoemissive elements wherein each photoemissive element must be discharged once per cycle, the photo-E. M. F. cells can have the potential thereacross varied at will (by the change in light) and need not have this potential brought to zero once every scanning cycle. The modulated electron stream divides equally between the collector sections or electrodes 45 and 46 which, being electronically emissive, cause current flow between said electrodes in opposite directions during the alternate half-cycles of the carrier impressed thereon by the alternating source 54. This current flow, which varies with changes in light radiation of different areas on the mosaic 41 as explained above, is utilized to generate an output signal in the output circuit 55 in a manner analogous to the modification shown in Fig. 1. Although various current supply and capacity-neutralizing connections may be employed, for simplicity an arrangement similar to Fig. 1 is shown, including a bridge network 56 comprising resistance arms connected across the carrier source 54 and a center tap for the conductor 57 extending to the load resistor 58. The terminals of the bridge and carrier source are connected through blocking condensers 61 and 62. The carrier source is also connected to the collector electrode 46 and the insulated capacity-neutralizing electrode 63, the latter being arranged and mounted so that the interelectrode capacitance between electrodes 45 and 63 is substantially equal to that between 45 and 46. The required positive potentials for electrodes 45 and 46 are impressed thereon through the radio-frequency chokes 65 and 66, as shown. It will be apparent that the operation of the modulator portion of the system shown in Fig. 2 is essentially the same as that of Fig. 1 except that the collector electrodes or cathodes 45 and 46 are rendered emissive by electron bombardment instead of by light radiations.

Various modifications may be made in the embodiments of the invention described above without departing from the scope of the invention.

I claim:

1. In a modulator for picture transmission, in combination, a triode phototube provided with two contiguous electron-emissive cathodes exposed to radiation to produce electrons and a neutralizing electrode spaced therefrom and isolated from cathode emission, a source of alternating carrier current, a bridge network having opposite terminals connected to said source of carrier current and also to a cathode and neutralizing electrode of said tube, means including said source for rendering the cathodes of said tube alternately operative to establish current flow to the other cathode as an anode on alternate half-cycles of said carrier-current source and an output circuit connected to one of said cathodes to derive a signal composed of an alternating carrier from said source, modulated in accordance with the instantaneous variations in the excitation of said electron-emissive cathodes.

2. A modulator system for picture transmission comprising an electric discharge tube provided with two contiguous electron-emissive cathodes and a capacitance-neutralizing electrode having substantially the same capacitive reactance relation with one of said cathodes as that between the two cathodes, said neutralizing electrode being isolated from the electron emission of both cathodes, means for equally exciting both of said cathodes to induce electron emission therefrom, a source of alternating carrier current of predetermined frequency, connections between said source of carrier current and a cathode and neutralizing electrode of said tube for rendering the cathodes of said tube alternately operative to establish current flow to the other cathode as an anode on alternate half-cycles of said carrier-current source, a balanced bridge including the interelectrode capacitance between one cathode and said neutralizing electrode and between the two cathodes respectively as two arms of said bridge and an output circuit connected to one of said cathodes to derive a modulated signal composed of an alternating carrier of said predetermined frequency, modulated in accordance with the instantaneous variations in the excitation of the electron-emissive cathodes of said discharge tube.

3. A modulator system of the character described comprising a pick-up phototube for scanning pictures or images, said tube being provided with two contiguous electron-emissive cathodes and a capacitance-neutralizing electrode having substantially the same capacitive reactance relation with one of said cathodes as that between the two cathodes, an output circuit for said tube including one of said cathodes, an alternating carrier-current source and means comprising a balancing network connected between said source and said output circuit for generating a modulated carrier free of direct-current components in said output circuit upon equal excitation of both of said cathodes, said network including the space paths between the cathodes and neutralizing electrode of said tube and impedances external to said space paths.

4. A modulator system of the character described comprising a pickup phototube for scanning pictures or images, said tube being provided with two contiguous electron-emissive cathodes and a capacitance-neutralizing electrode spaced therefrom, an output circuit for said tube connected to one of said cathodes, an alternating carrier-current source and connections between said source and the electrodes of said pickup tube for generating a modulated carrier in said output circuit upon equal varying excitation of both of said cathodes.

5. A modulator system of the character described comprising a pickup phototube for scanning pictures or images, said tube being provided with two contiguous electron-emissive cathodes and a neutralzing electrode spaced therefrom and insulated from the electron emission of both of said cathodes, means for variably exciting both of said electron-emissive cathodes equally, an output circuit for said tube, an alternating carrier-current source and a balancing network connected between said source and said output circuit for generating a modulated carrier in said output circuit substantially free of direct-current components, said balancing network including external impedances and the space paths between the electrodes of said tube.

6. A modulator system of the character described comprising a pickup tube of the electronic camera type, said tube being provided with a mosaic plate exposed to light radiation, electronic scanning means for generating a beam of electrons impinging on said plate and a split collector electrode adjacent said mosaic plate to collect modulated emission therefrom, the sections of said split collector electrode being constructed to provide secondary emission of electrons, an output circuit including said collector electrode, a source of alternating carrier-current connected to said collector electrode and means including the split collector electrode of said tube for producing a modulated carrier free of direct-current components in said output circuit.

7. A modulator system of the character described comprising a pickup tube of the electronic camera type, said tube being provided with a photo-electronic surface, scanning means for scanning said surface with a beam of electrons, a split collector electrode, a source of alternating carrier current connected to said collector electrode, an output circuit connected to said electrode and connections between said source and said tube for producing a modulated carrier in said output circuit varying in accordance with the intensity of illumination of different elemental areas of said photo-electronic surface.

8. A modulator system of the character described comprising a pickup tube of the electronic camera type, said tube being provided with a photo-electronic surface on which a virtual image of the picture to be transmitted is formed and spaced collector means to receive the modulated electronic space current from said photo-electronic surface, said collector means being split into a plurality of sections and being electron-emissive to provide space-current flow between any section and another section which has a relatively positive potential, an alternating carrier source, connections from said source to render each of said collector sections alternately positive and negative with respect to another section, means to equalize the alternating current flow between said sections to produce a symmetrical wave upon space-current bombardment of the electron-emissive surfaces of the collector means by the electrons from said photo-electronic surface and an output circuit connected to said collector means to derive a modulated carrier substantially free of direct-current components.

9. A modulator system of the character described comprising an alternating carrier source, a pickup tube of the electronic camera type provided with an output signal circuit, said tube comprising a mosaic plate or target on which light radiations from the object or picture to be transmitted impinge, said plate containing photo-E. M. F. elements, said tube further comprising a split or sectional collector electrode connected to said carrier source and output signal circuit and arranged to intercept electrons from said mosaic plate or target, each of the sections of said sectional collector electrode being alternately positive and negative on alternate half-cycles of the applied carrier from said source, means for varying the electron current from said mosaic plate impinging on said collector electrode in accordance with the intensity of illumination of different elemental areas of said plate and a capacity-neutralizing electrode for said collector electrode whereby the modulated carrier in said output signal circuit is substantially free of direct-current components.

10. A modulator system as defined in claim 9 in which the mosaic plate of the pickup tube is an apertured plate and the means for varying the electron current impinging on said collector electrode includes an electron scanning gun on the opposite side of said mosaic plate from said collector electrode.

11. A light translating system comprising a mosaic plate on which radiation from an object or picture to be transmitted is applied, a split or sectional collector electrode arranged to intercept electrons from said mosaic plate, an output circuit connected to said collector electrode and means including an alternating carrier source and a capacity-neutralizing electrode adjacent said collector electrode for producing a modulated alternating current in said output circuit varying in accordance with variations in intensity of the radiation from different elemental areas of said object or picture and substantially free of direct-current components, said alternating current source being connected to said collector electrode and said neutralizing electrode.

12. A light translating system as defined in claim 11 in which the sections of said collector electrode are equally bombarded by the emission from said mosaic plate and are electron-emissive to cause space current flow between said sections thereof as the electrode potentials are varied by the applied alternating carrier from said source.

JOHN R. SHONNARD.

REFERENCES CITED

The following references are of record in the file of this patent:

UNITED STATES PATENTS

| Number | Name | Date |
|---|---|---|
| 1,706,185 | Sabbah | Mar. 19, 1929 |
| 2,262,123 | Sukumlyn | Nov. 11, 1941 |
| 2,280,922 | Lubszynski | Apr. 28, 1942 |
| 2,304,091 | Hergenrother | Dec. 8, 1942 |
| 2,430,095 | Asten | Nov. 4, 1947 |
| 2,459,293 | Shonnard | Jan. 18, 1949 |
| 2,459,778 | Larson | Jan. 18, 1949 |